(12) United States Patent
Zhang et al.

(10) Patent No.: US 11,330,615 B2
(45) Date of Patent: May 10, 2022

(54) WIRELESS COMMUNICATION METHOD, TERMINAL DEVICE AND TRANSMITTING AND RECEIVING NODES

(71) Applicant: GUANGDONG OPPO MOBILE TELECOMMUNICATIONS CORP., LTD., Guangdong (CN)

(72) Inventors: Zhi Zhang, Guangdong (CN); Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 278 days.

(21) Appl. No.: 16/602,531

(22) PCT Filed: Apr. 27, 2017

(86) PCT No.: PCT/CN2017/082216
§ 371 (c)(1),
(2) Date: Oct. 24, 2019

(87) PCT Pub. No.: WO2018/195861
PCT Pub. Date: Nov. 1, 2018

(65) Prior Publication Data
US 2021/0289532 A1    Sep. 16, 2021

(51) Int. Cl.
*H04W 72/00* (2009.01)
*H04W 72/12* (2009.01)
*H04W 72/04* (2009.01)

(52) U.S. Cl.
CPC ..... *H04W 72/1289* (2013.01); *H04W 72/042* (2013.01); *H04W 72/046* (2013.01); *H04W 72/0446* (2013.01)

(58) Field of Classification Search
CPC .......... H04W 72/1289; H04W 72/042; H04W 72/0446; H04W 72/046
See application file for complete search history.

(56) References Cited

U.S. PATENT DOCUMENTS 8,681,724 B2    3/2014   Du
2011/0267951 A1   11/2011  Stanwood
(Continued)

FOREIGN PATENT DOCUMENTS

CN    102186251 A    9/2011
CN    105992378 A    10/2016
(Continued)

OTHER PUBLICATIONS

First Office Action of the Japan application No. 2019-557638, dated Apr. 2, 2021.
(Continued)

*Primary Examiner* — Melvin C Marcelo
(74) *Attorney, Agent, or Firm* — Ladas & Parry LLP (57) ABSTRACT

Disclosed are a wireless communication method, a terminal device, and transmitting and receiving nodes. The method comprises: a terminal device receiving, in a first time domain scheduling unit, first downlink control information; and the terminal device acquiring, according to the first downlink control information, information about second downlink control information to be detected in the first time domain scheduling unit. The method, the terminal device and the transmitting and receiving nodes in the embodiments of the present application are beneficial to reduce the complexity of PDCCH detection by the terminal device.

20 Claims, 3 Drawing Sheets

(56) References Cited

U.S. PATENT DOCUMENTS

| | | | |
|---|---|---|---|
| 2011/0267957 | A1 | 11/2011 | Du |
| 2014/0211761 | A1 | 7/2014 | Silver et al. |
| 2016/0128028 | A1 | 5/2016 | Mallik et al. |
| 2019/0281481 | A1* | 9/2019 | Shen .................. H04W 72/042 |

FOREIGN PATENT DOCUMENTS

| | | | |
|---|---|---|---|
| JP | 2012525743 | A | 10/2012 |
| JP | 2020504540 | A | 2/2020 |
| KR | 20120025595 | A | 3/2012 |
| KR | 20120131184 | A | 12/2012 |
| KR | 2016037757 | A | 4/2016 |
| RU | 2011107598 | A | 9/2012 |
| RU | 2011120061 | A | 12/2012 |
| RU | 2553666 | C2 | 6/2015 |
| WO | 2010078962 | A1 | 7/2010 |
| WO | 2012146095 | A1 | 11/2012 |
| WO | 2013002685 | A1 | 1/2013 |
| WO | 2016069270 | A1 | 5/2016 |
| WO | 2018127145 | A1 | 7/2018 |

OTHER PUBLICATIONS

Written Opinion of the Singaporean application No. 11201909820X, dated Mar. 2, 2021.
Supplementary European Search Report in the European application No. 17906925.7, dated Mar. 23, 2020.
First Office Action of the Canadian application No. 3061079, dated Dec. 2, 2020.
First Office Action of the Korean application No. 10-2019-7034470, dated Jan. 26, 2021.
First Office Action of the Indian application No. 201917046773, dated Jan. 29, 2021.
Huawei, HiSilicon, "Multi-TRP coordinated transmission" 3GPP TSG RAN WG1 Meeting #88bis R1-1704225 Spokane, USA, Apr. 3-7, 2017.
AT&T, "Multi DCI NC-JT Framework" 3GPP TSG RAN WG1 Meeting #88bis R1-1704339 Spokane, USA Apr. 3-7, 2017.
Samsung, "Discussions on NR multi-TRP and multi-panel support", 3GPP TSG RAN WG1 Meeting #88bis R1-1705338 Spokane, USA, Apr. 3-7, 2017.
Nokia, Alcatel-Lucent Shanghai Bell, "Non-coherent Multi-node Transmission in the 5G New Radio" 3GPP TSG-RAN WG1 #88 bis R1-1705957 Spokane, WA, USA, Apr. 3-7, 2017.
International Search Report in the international application No. PCT/CN2017/082216, dated Oct. 9, 2017.
Written Opinion of the International Search Authority in the international application No. PCT/CN2017/082216, dated Oct. 9, 2017.
Notice of Allowance of the Russian application No. 2019136474, dated Jun. 9, 2020.
English Translation of the Written Opinion of the International Search Authority in the international application No. PCT/CN2017/082216, dated Oct. 9, 2017.
Notice of Allowance of the Korean application No. 10-2019-7034470, dated Jul. 29, 2021.
Second Office Action of the Canadian application No. 3061079, dated Oct. 8, 2021.
Office Action of the Australian application No. 2017411263, dated Jan. 31, 2022.

* cited by examiner

A terminal device receives first downlink control information in a first time-domain scheduling unit ~110

The terminal device acquires information about second downlink control information to be detected in the first time-domain scheduling unit according to the first downlink control information ~120

WIRELESS COMMUNICATION METHOD, TERMINAL DEVICE AND TRANSMITTING AND RECEIVING NODES

RELATED APPLICATION

This application is an application under 35 U.S.C. 371 of International Application No. PCT/CN2017/082216 filed on Apr. 27, 2017, the entire contents of which are incorporated herein by reference.

TECHNICAL FIELD

The embodiments of the disclosure relate to the field of communication, and more particularly to a method for wireless communication, a terminal device and a transmission and reception point.

BACKGROUND

In current discussions about new radio (NR) or 5G ($5^{th}$ Generation), a terminal device may receive multiple physical downlink control channels (PDCCHs), and each PDCCH indicates related information on corresponding data. Similarly, the terminal device is required to detect the multiple PDCCHs at the same time, which results in high complexity.

SUMMARY

In view of this, a method for wireless communication, a terminal device and a transmission and reception point are provided according to the embodiments of the disclosure, which are favorable for reducing complexity in detecting a PDCCH by the terminal device.

In a first aspect, a method for wireless communication is provided, which includes operations as follows: a terminal device receives first downlink control information in a first time-domain scheduling unit; and the terminal device acquires information about second downlink control information to be detected in the first time-domain scheduling unit according to the first downlink control information.

The information about the second downlink control information is acquired according to the first downlink control information, which is favorable for reducing complexity in detecting a PDCCH by the terminal device.

Optionally, in the embodiments of the disclosure, a network device may associate each piece of downlink control information with other downlink control information. A format size of the downlink control information may be mapped to the number of pieces of subsequent downlink control information. After receiving the downlink control information, the terminal device may acquire the number of pieces of the subsequent downlink control information according to the format size of the downlink control information. All of the downlink control information to be sent by the network device may also be set to have the same format. After detecting the first downlink control information, the terminal device may detect the second downlink control information according to the format of the first downlink control information.

In a possible implementation, the first downlink control information may contain the information about the second downlink control information, and the operation that the terminal device acquires the information about the second downlink control information to be detected in the first time-domain scheduling unit according to the first downlink control information may include an operation that the terminal device acquires the information about the second downlink control information from the first downlink control information.

In a possible implementation, the method may further include an operation that the terminal device detects the second downlink control information in the first time-domain scheduling unit according to the information about the second downlink control information.

In a possible implementation, the information about the second downlink control information may include at least one of a search space of the second downlink control information, an aggregation level of the second downlink control information, a resource position of the second downlink control information, a size of the second downlink control information, a format of the second downlink control information, beam information for receiving and/or sending the second downlink control information or quasi-co-location information of the second downlink control information.

In a possible implementation, the method may further include operations as follows. The terminal device determines the number N of pieces of the second downlink control information according to the information about the second downlink control information, with N being an integer, N≤(M−1), M being the number of pieces of downlink control information pre-configured by a network device for the terminal device, and M being a positive integer. If N is a positive integer, the terminal device learns that N pieces of second downlink control information exist in the first time-domain scheduling unit; or if N is 0, the terminal device learns that no second downlink control information exists in the first time-domain scheduling unit.

In a case that the number of pieces of downlink control information sent to the terminal device by the network device is smaller than the number of pieces of the downlink control information configured by the network device, complexity in blind detection of the terminal device can be reduced, and power consumption of the terminal device can also be reduced.

In a possible implementation, the information about the second downlink control information may be the number N of pieces of the second downlink control information, or the number (N+1) of pieces of downlink control information sent by a transmission and reception point. The downlink control information sent by the transmission and reception point includes the first downlink control information and the second downlink control information.

In a possible implementation, the method may further include operations as follows. The terminal device receives instruction information sent by the network device. The instruction information is used to instruct the terminal device to receive multiple pieces of downlink control information in the first time-domain scheduling unit.

In a possible implementation, the first downlink control information and the second downlink control information may be sent by different transmission and reception points.

In a second aspect, a method for wireless communication is provided, which includes an operation as follows: a first transmission and reception point sends first downlink control information to a terminal device in a first time-domain scheduling unit. The first downlink control information contains information about second downlink control information to be detected by the terminal device in the first time-domain scheduling unit, and the second downlink control information is used to indicate a downlink resource allocated for second downlink data.

In a possible implementation, the information about the second downlink control information may include at least one of a search space of the second downlink control information, an aggregation level of the second downlink control information, a resource position of the second downlink control information, a size of the second downlink control information, a format of the second downlink control information, beam information for receiving and/or sending the second downlink control information or quasi-co-location information of the second downlink control information.

In a possible implementation, the information about the second downlink control information may be the number N of pieces of the second downlink control information, or the number (N+1) of downlink control information sent by at least one transmission and reception point. The at least one transmission and reception point includes the first transmission and reception point, with N being an integer, N≤(M−1), M being the number of pieces of downlink control information pre-configured by a network device for the terminal device and M being a positive integer.

In a possible implementation, the second downlink control information may be sent by a second transmission and reception point.

In a third aspect, a terminal device is provided, which is configured to execute the method in the first aspect or any possible implementation of the first aspect. Specifically, the terminal device includes units configured to execute the method in the first aspect or any possible implementation of the first aspect.

In a fourth aspect, a transmission and reception point is provided, which is configured to execute the method in the second aspect or any possible implementation of the second aspect. Specifically, the transmission and reception point includes units configured to execute the method in the second aspect or any possible implementation of the second aspect.

In a fifth aspect, a terminal device is provided, which includes a memory, a processor, an input interface and an output interface. The memory; the processor, the input interface and the output interface are connected through a bus system. The memory is configured to store an instruction. The processor is configured to execute the instruction stored in the memory to execute the method in the first aspect or any possible implementation of the first aspect.

In a sixth aspect, a transmission and reception point is provided, which includes a memory, a processor, an input interface and an output interface. The memory, the processor, the input interface and the output interface are connected through a bus system. The memory is configured to store an instruction. The processor is configured to execute the instruction stored in the memory to execute the method in the second aspect or any possible implementation of the second aspect.

In a seventh aspect, a computer storage medium is provided, which is configured to store a computer software instruction for executing the method in the first aspect or any possible implementation of the first aspect or the method in the second aspect or any possible implementation of the second aspect, and the computer software instruction includes a program designed to execute the above aspects.

These aspects or other aspects of the disclosure will become clear and easy to understand through the following descriptions about the embodiments.

DETAILED DESCRIPTION

The technical solutions in the embodiments of the disclosure are clearly and completely described below in combination with the drawings in the embodiments of the disclosure.

It is to be understood that the technical solutions of the embodiments of the disclosure may be applied to various communication systems, such as, a global system of mobile communication (GSM), a code division multiple access (CDMA) system, a wideband code division multiple access (WCDMA) system, a general packet radio service (GPRS), a long term evolution (LTE) system, an LTE frequency division duplex (FDD) system, LTE time division duplex (TDD), a universal mobile telecommunication system (UMTS), a worldwide interoperability for microwave access (WiMAX) communication system or a future 5G system.

Particularly, the technical solutions of the embodiments of the disclosure may be applied to various non-orthogonal multiple access technology-based communication systems, for example, a sparse code multiple access (SCMA) system and a low density signature (LDS) system. In practical, the SCMA system and the LDS system may also have other names in the field of communication. Furthermore, the technical solutions of the embodiments of the disclosure may be applied to multi-carrier transmission systems adopting the non-orthogonal multiple access technology, for example, orthogonal frequency division multiplexing (OFDM), filter bank multi-carrier (FBMC), generalized frequency division multiplexing (GFDM) and filtered-OFDM (F-OFDM) systems which adopt the non-orthogonal multiple access technology.

In the embodiments of the disclosure, a terminal device may refer to a user equipment (UE), an access terminal, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal device in the future 5G network, a terminal device in a future evolved public land mobile network (PLMN) or the like. which is not limited in the embodiments of the disclosure.

In the embodiments of the disclosure, a network device may be a device configured to communicate with the terminal device. The network device may be a base transceiver station (BTS) in the GSM or the CDMA, may also be a NodeB (NB) in the WCDMA system, may also be an evolutional node B (eNB or eNodeB) in the LTE system and may further be a wireless controller in a cloud radio access network (CRAN) scenario. Alternatively, the network device may be a relay station, an access point, a vehicle-mounted device, a wearable device, a network device in the future 5G network, a network device in the future evolved PLMN or the like, which is not limited in the embodiments of the disclosure.

Figure 1:
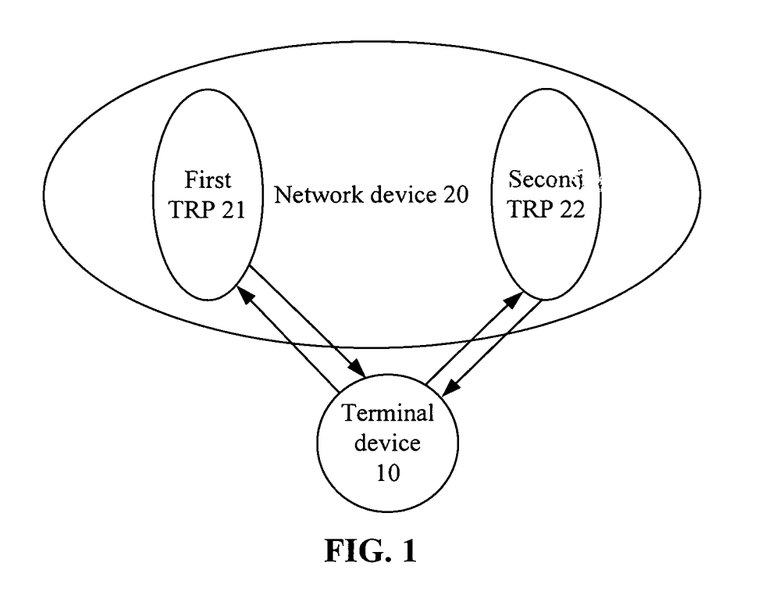
FIG. 1 is a schematic diagram showing an application scenario according to an embodiment of the disclosure.

A network in the 5G system is different from those in the conventional 3G ($3^{th}$ Generation) and 4G ($4^{th}$ Generation) systems. The 5G system has multiple frequencies (high and low frequencies and unlicensed frequency bands) and multi-layer superimposition (for example, superimposition of a macro-cell and a micro-cell). During implementation of multiple connections, a UE is connected to the network via multiple transmission and reception points in multiple frequencies. As shown in FIG. 1, a communication system in FIG. 1 may include a terminal device 10 and a network device 20. The network device 20 includes a first transmission and reception point (TRP) 21 and a second TRP 22. The network device 20 is configured to provide communication service and access to a core network for the terminal device 10. The terminal device 10 accesses to the network by searching for a synchronization signal, a broadcast signal and the like sent by the network device 20, thereby communicating with the network. Arrows shown in FIG. 1 may represent uplink/downlink transmission implemented through a cellular link between the terminal device 10 and the network device 20.

In current discussions about 5G/NR, a terminal device may receive multiple physical downlink control channels (PDCCHs) in a time-domain scheduling unit, and each of the PDCCHs may indicate related information about data corresponding to the PDCCH, for example, a position of resources occupied by the data or a transmission format of the data. The terminal device is required to perform blind detection on the multiple PDCCHs thereof in the time-domain scheduling unit. In order to reduce complexity in blind detection on the multiple PDCCHs, optimization processing is required.

For convenience of subsequent description, a blind detection process for the PDCCH is briefly introduced herein at first. Specifically, the terminal device usually does not learn about the number of control channel elements (CCEs) occupied by a present PDCCH and format information of downlink control information (DCI) that is transmitted, and also does not learn about a position of information required by itself. However, the terminal device knows currently-desired information. For example, desired information for the terminal device in an idle state is a paging message, and the desired information for the terminal device is an uplink grant when uplink data is to be sent. For the different types of desired information, the terminal device performs cyclic redundancy check on CCE information by using a radio network temporary identifiers (RNTI) corresponding to the desired information. If cyclic redundancy check passes, the terminal device knows that the information is required and may further know a DCI format and a modulation mode corresponding to the information, to acquire DCI content. This is called a blind detection process.

Figure 2:
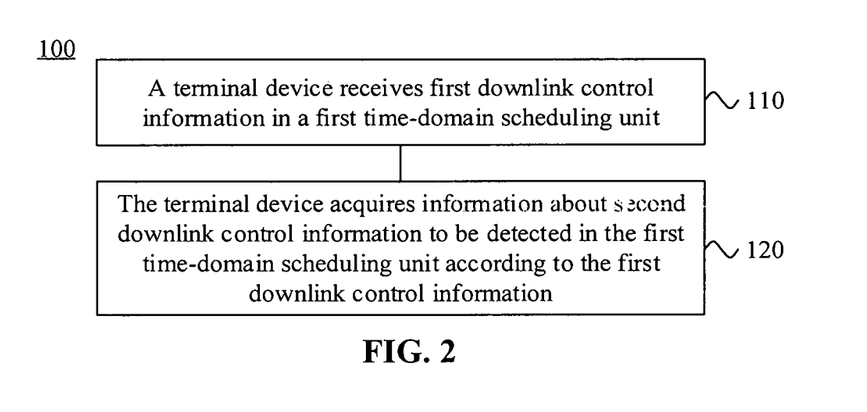
FIG. 2 is a schematic block diagram of a method for wireless communication according to an embodiment of the disclosure.

FIG. 2 is a schematic block diagram of a method 100 for wireless communication according to an embodiment of the disclosure. As shown in FIG. 2, the method 100 includes the following operations S110 and S120.

In S110, a terminal device receives first downlink control information in a first time-domain scheduling unit.

In S120, the terminal device acquires information about second downlink control information to be detected in the first time-domain scheduling unit according to the first downlink control information.

The downlink control information is control information carried in a physical downlink control channel PDCCH and sent to the terminal device by a network device, and is used to schedule data of the terminal device. The downlink control information includes resource allocation for uplink and downlink data, hybrid automatic repeat request (HARQ) information, power control information and the like. With development of wireless communication, a network device may configure multiple PDCCHs in a time-domain scheduling unit, and downlink control information carried in the multiple PDCCHs may be used to indicate scheduling information for different data. In order to reduce complexity in blind detection of the terminal device on the PDCCH, multiple PDCCHs in the same time-domain scheduling unit may be associated. For example, some information is configured in each piece of downlink control information to indicate information about the other downlink control information. In this way, the terminal device, after detecting the first downlink control information, may further acquire some information about the second downlink control information, thereby reducing complexity in blind detection of the terminal device.

Optionally, in the embodiment of the disclosure, the network device may associate each piece of downlink control information with other downlink control information. For example, a format size of the downlink control information may be mapped to the number of pieces of subsequent downlink control information. Specifically, if the number of bits of the downlink control information is 5 bit, it is indicated that the number of pieces of the subsequent downlink control information is 0. If the number of bits of the downlink control information is 6 bit, it is indicated that the number of the subsequent downlink control information is 1, and so forth. Then, the terminal device, after receiving the downlink control information, may acquire the number of the subsequent downlink control information based on the format size of the downlink control information. For another example, all of the downlink control information to be sent by the network device may also be set to have the same format, and the terminal device, after detecting the first downlink control information, may detect the second downlink control information according to the format of the first downlink control information.

Optionally, in the embodiment of the disclosure, the first downlink control information contains the information about the second downlink control information, and the operation that the terminal device acquires the information about the second downlink control information to be detected in the first time-domain scheduling unit according to the first downlink control information includes an operation as follows: the terminal device acquires the information about the second downlink control information from the first downlink control information.

Specifically, a special bit may also be set in each piece of downlink control information to indicate the information about the second downlink control information. For example, 4 bits may be set to indicate a format of the second downlink control information or indicate a resource position of the second downlink control information. Alternatively, a special bit may also be set to indicate the number of pieces of the second downlink control information.

Optionally, in the embodiment of the disclosure, the method further includes an operation as follows: the terminal device detects the second downlink control information in the first time-domain scheduling unit according to the information about the second downlink control information.

If the first downlink control information contains the information about existing second downlink control information, the terminal device, after acquiring the first downlink control information, detects the second downlink control information in the first scheduling unit. Specifically, the information about the second downlink control information includes, but is not limited to, at least one of a search space of the second downlink control information, an aggregation level of the second downlink control information, a resource position of the second downlink control information, a size of the second downlink control information, a format of the second downlink control information, beam information for receiving and/or sending the second downlink control information or quasi-co-location information of the second downlink control information.

The blind detection process of the terminal devise for the PDCCH is described above. If the terminal device sequentially searches according to a sequence of CCEs, the amount of calculation of the terminal device is considerably large, particularly for a system having a large bandwidth and a large number of CCEs. Therefore, the concept of search space is defined in a protocol to make some limits to possible arrangement positions of PDCCHs in different formats in the system. The PDCCHs in different formats correspond to different search spaces. That is, if the first downlink control information contains the search space of the second downlink control information, the terminal device may obtain an arrangement position of the second downlink control information, thereby the complexity in blind detection of the terminal device.

The number of CCEs in a PDCCH is usually called an aggregation level of the CCEs. For example, the aggregation level may be 1, 2, 4 and 8 continuous CCEs. That is, if the first downlink control information contains the aggregation level of the second downlink control information, the terminal device learns about the number of CCEs contained in a PDCCH carrying the second downlink control information, and thus complexity in blind detection of the terminal device on the second downlink control information can be reduced.

Alternatively, if the first downlink control information contains a position of resources occupied by the second downlink control information, the terminal device may directly receive the second downlink control information at a position indicated by the information about the second downlink control information contained in the first downlink control information without performing blind detection in a control resource region of the whole time-domain scheduling unit.

In addition, if the first downlink control information contains the information of the second downlink control information such as the size of the second downlink control information, the format of the second downlink control information, the beam information for receiving and/or sending the second downlink control information, the quasi-co-location information of the second downlink control information, the terminal device may also learn about the information about the second downlink control information in advance, thereby reducing the detection complexity in detecting the second downlink control information.

Optionally, in the embodiment of the disclosure, the method further includes an operation as follows: the terminal device determines the number N of pieces of the second downlink control information according to the information about the second downlink control information. N is an integer, $N \leq (M-1)$, M is the number of pieces of downlink control information pre-configured by a network device for the terminal device, and M is a positive integer. If N is a positive integer, the terminal device learns that N pieces of second downlink control information exist in the first time-domain scheduling unit. Alternatively, if N is equal to 0, the terminal device learns that no second downlink control information exists in the first time-domain scheduling unit.

Specifically, the terminal device may determine the number of pieces of the second downlink control information or determine whether there is subsequent second downlink control information or not according to the acquired information about the second downlink control information. Therefore, in a case that the number of pieces of downlink control information sent to the terminal device by the network device is smaller than the number of pieces of downlink control information configured by the network device, the complexity in blind detection of the terminal device can be reduced, and power consumption of the terminal device can also be reduced.

Generally, the network device may pre-configure the number of pieces of downlink control information for the terminal device, or the number of pieces of downlink control information is determined by negotiation between the terminal device and the network device. The terminal device may perform blind detection on the downlink control information according to the number. If the number of pieces of downlink control information sent by the network device in a certain time-domain scheduling unit is smaller than the number pre-configured by the network device or the number specified in a protocol, it is not required for the terminal device to perform blind detection for so many times, thereby reducing the complexity in blind detection of the terminal device. For example, if the number pre-configured by the network device is 5 while the network device sends only three pieces of downlink control information to the terminal device in a certain time-domain scheduling unit, it is only required for the terminal device to detect three pieces of downlink control information, rather than continue detecting the subsequent two pieces of downlink control information. For another example, if the network device configures to send only one piece of downlink control information, the terminal device, after detecting the downlink control information, stops subsequent detection.

Optionally, the information about the second downlink control information is the number N of pieces of the second downlink control information, or the number (N+1) of pieces of downlink control information sent by a transmission and reception point. The downlink control information sent by the transmission and reception point includes the first downlink control information and the second downlink control information.

That is, the information used to determine the number of pieces of the second downlink control information may be the number of pieces of the second downlink control information except the first downlink control information, and may also be the number of pieces of all the downlink control information sent by all network devices. In this case, the terminal device may calculate the number of pieces of the second downlink control information according to the number of pieces of all the downlink control information.

For example, the information about the second downlink control information indicates that the network device sends X PDCCHs. Therefore, if a PDCCH indicating that there is 1 PDCCH is received, it is not required for the UE to detect the second PDCCH. If a PDCCH indicating that there are 2 PDCCHs is received, the UE tries to detect the second NR-PDCCH, and in a case that the detection is failed, may feedback a NACK to the network.

For another example, the information about the second downlink control information indicates that the network device sends Y additional PDCCHs except a received PDCCH. Therefore, if a PDCCH indicating that there is no additional PDCCH is received, it is not required for the UE to detect the second PDCCH. If a PDCCH indicating that there is another PDCCH is received, the UE tries to detect the second PDCCH, and in a case that the detection is failed, may feedback a NACK to the network.

Optionally, in the embodiment of the disclosure, the method further includes an operation as follows: the terminal device receives instruction information sent by the network device. The instruction information is used to instruct the terminal device to receive multiple pieces of downlink control information in the first time-domain scheduling unit.

Specifically, the network may instruct the terminal device to enter the following mode with configuration. The network may instruct the terminal device to be switched from a mode of receiving one PDCCH to a mode of receiving multiple PDCCHs, in which, the terminal device determines to use the abovementioned solution. Also, the network device may also directly instruct die terminal device to detect multiple PDCCHs. For example, the network device may use 1 bit to indicate whether it is a mode of receiving multiple PDCCHs or not. A bit 0 indicates that it is a mode of receiving one PDCCH; and a bit 1 indicates that it is a mode of receiving multiple PDCCHs.

Optionally, in the embodiment of the disclosure, the first downlink control information and the second downlink control information are sent by different transmission and reception points. Generally, the above multiple PDCCHs may be transmitted through multiple TRPs, and may also be transmitted through the same TRP, which is not limited in the embodiment of the disclosure.

It is to be understood that the TRP may be the above network device, for example, a base station, and may also be a microcell, a hotspot and the like. Any device capable of providing network service for the terminal device may be the TRP in the embodiment of the disclosure.

Figure 3:
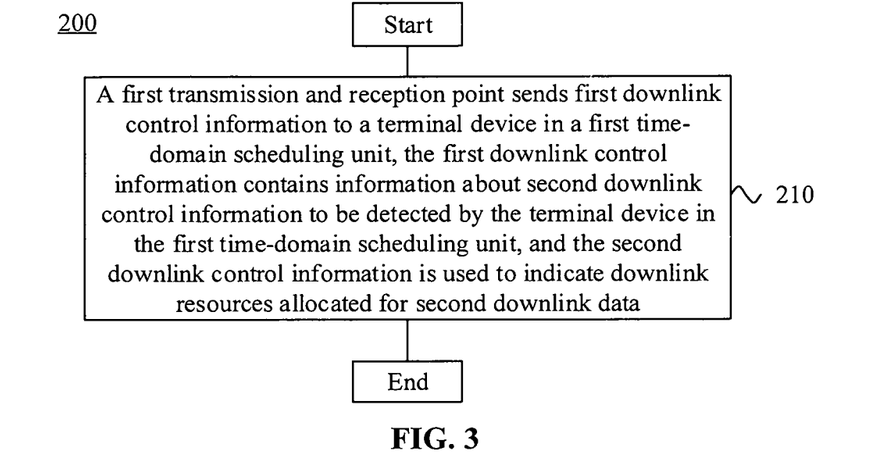
FIG. 3 is another schematic block diagram of a method for wireless communication according to an embodiment of the disclosure.

FIG. 3 is a schematic block diagram of a method 200 for wireless communication according to an embodiment of the disclosure. As shown in FIG. 3, the method 200 includes the following operation S210.

In S210, a first transmission and reception point sends first downlink control information to a terminal device in a first time-domain scheduling unit. The first downlink control information contains information about second downlink control information to be detected by the terminal device in the first tune-domain scheduling unit. The second downlink control information is used to indicate a downlink resource allocated for second downlink data.

Therefore, the method for wireless communication according to the embodiment of the disclosure facilitates reducing complexity in detecting the PDCCH by the terminal device.

Optionally, in the embodiment of the disclosure, the information about the second downlink control information includes at least one of a search space of the second downlink control information, an aggregation level of the second downlink control information, a resource position of the second downlink control information, a size of the second downlink control information, a format of the second downlink control information, beam information for receiving and/or sending the second downlink control information or quasi-co-location information of the second downlink control information.

Optionally, in the embodiment of the disclosure, the information about the second downlink control information is the number N of pieces of the second downlink control information or the number (N+1) of pieces of downlink control information sent by at least one transmission and reception point. The at least one transmission and reception point includes the first transmission and reception point. N is an integer, $N \leq (M-1)$, M is the number of pieces of downlink control information pre-configured by a network device for the terminal device and M is a positive integer.

Optionally, in the embodiment of the disclosure, the second downlink control information is sent by a second transmission and reception point.

It is to be understood that interaction of the network device with the terminal device and related properties, functions and the like of the network device described from the network device correspond to related properties and functions of the terminal device. That is, if the terminal device sends information to the network device, the information is received by the network device correspondingly, which is not described repeatedly here anymore for simplicity. It is also to be understood that, in various embodiments of the disclosure, a sequence number of each operation does not refer to an execution sequence, and the execution sequence of each operation should be determined by a function and an internal logic thereof, and should not form any limit to an implementation process of the embodiments of the disclosure.

Figure 4:
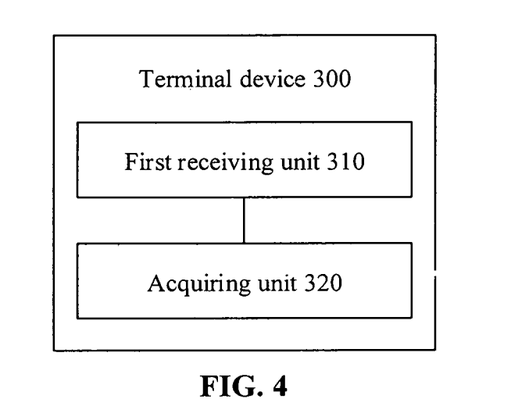
FIG. 4 is a schematic block diagram of a terminal device according to an embodiment of the disclosure.

FIG. 4 is a schematic block diagram of a terminal device 300 for wireless communication according to an embodiment of the disclosure. As shown in FIG. 4, the terminal device 300 includes a first receiving unit 310 and an acquiring unit 320.

The first receiving unit 310 is configured to receive first downlink control information in a first time-domain scheduling unit.

The acquiring unit 320 is configured to acquire information about second downlink control information to be detected in the first time-domain scheduling unit according to the first downlink control information.

Therefore, the terminal device for wireless communication according to the embodiment of the disclosure facilitates reducing complexity in detecting a PDCCH by the terminal device.

Optionally, in the embodiment of the disclosure, the first downlink control information contains the information about the second downlink control information, and the acquiring unit 320 is specifically configured to acquire the information about the second downlink control information from the first downlink control information.

Optionally, in the embodiment of the disclosure, the terminal device 300 further includes a detecting unit 330, configured to detect the second downlink control information in the first time-domain scheduling unit according to the information about the second downlink control information.

Optionally, in the embodiment of the disclosure, the information about the second downlink control information includes at least one of a search space of the second downlink control information, an aggregation level of the second downlink control information, a resource position of the second downlink control information, a size of the second downlink control information, a format of the second downlink control information, beam information for receiving and/or sending the second downlink control information or quasi-co-location information of the second downlink control information.

Optionally, in the embodiment of the disclosure, the terminal device 300 further includes a determining unit 340, configured to determine the number N of pieces of the second downlink control information according to the information about the second downlink control information. N is an integer, $N \leq (M-1)$, M is the number of pieces of downlink control information pre-configured by a network device for the terminal device, and M is a positive integer; and a learning unit 350, configured to, if N is a positive integer, learn that N pieces of second downlink control information exist in the first time-domain scheduling unit, or if N is equal to 0, learn that no second downlink control information exists in the first time-domain scheduling unit.

Optionally, in the embodiment of the disclosure, the information about the second downlink control information is the number N of pieces of the second downlink control information or the number (N+1) of pieces of downlink control information sent by a transmission and reception point. The downlink control information sent by the transmission and reception point includes the first downlink control information and the second downlink control information.

Optionally, in the embodiment of the disclosure, the terminal device 300 further includes a second receiving unit 360, configured to receive instruction information sent by the network device. The instruction information is used to instruct the terminal device to receive multiple pieces of downlink control information in the first time-domain scheduling unit.

Optionally, in the embodiment of the disclosure, the first downlink control information and the second downlink control information are sent by different transmission and reception point's.

It is to be understood that the terminal device 300 for wireless communication according to the embodiment of the disclosure may correspond to the terminal device in the method embodiment of the disclosure, and the abovementioned and other operations and/or functions of the units in the terminal device 300 are configured to implement the flows executed by the terminal device in the method in FIG. 2 respectively, which are not be described repeatedly herein for simplicity.

Figure 5:
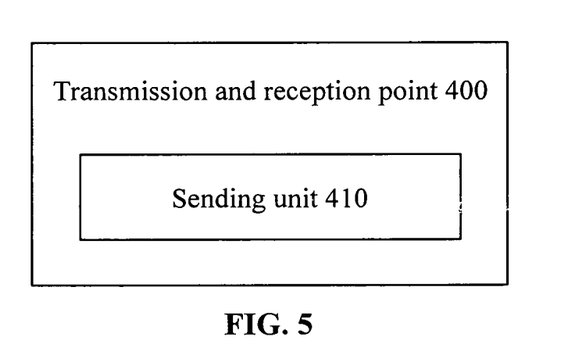
FIG. 5 is a schematic block diagram of a transmission and reception point according to an embodiment of the disclosure.

FIG. 5 is a schematic block diagram of a transmission and reception point 400 according to an embodiment of the disclosure. As shown in FIG. 5, the transmission and reception point 400 includes a sending unit 410.

The sending unit 410 is configured to send first downlink control information to a terminal device in a first time-domain scheduling unit. The first downlink control information contains information about second downlink control information to be detected by the terminal device in the first time-domain scheduling unit, and the second downlink control information is used to indicate a downlink resource allocated for second downlink data.

Therefore, the transmission and reception point according to the embodiment of the disclosure facilitates reducing complexity in detecting the PDCCH by the terminal device.

Optionally, in the embodiment of the disclosure, the information about the second downlink control information includes at least one of a search space of the second downlink control information, an aggregation level of the second downlink control information, a resource position for the second downlink control information, a size of the second downlink control information, a format of the second downlink control information, beam information for receiving and/or sending the second downlink control information or quasi-co-location information of the second downlink control information.

Optionally, in the embodiment of the disclosure; the information about the second downlink control information is the number N of pieces of the second downlink control information or the number (N+1) of pieces of downlink control information sent by at least one transmission and reception point. The at least one transmission and reception point includes the first transmission and reception point, N is an integer, $N \leq (M-1)$, M is the number of pieces of downlink control information pre-configured by a network device for the terminal device and M is a positive integer.

Optionally, in the embodiment of the disclosure, the second downlink control information is sent by a second transmission and reception point.

It is to be understood that the transmission and reception point 400 according to the embodiment of the disclosure may correspond to the transmission and reception point according to the method embodiment of the disclosure, and the abovementioned and other operations and/or functions of the units in the transmission and reception point 400 are configured to implement the flows executed by the network device in the method in FIG. 3 respectively, which are not described repeatedly herein for simplicity.

Figure 6:
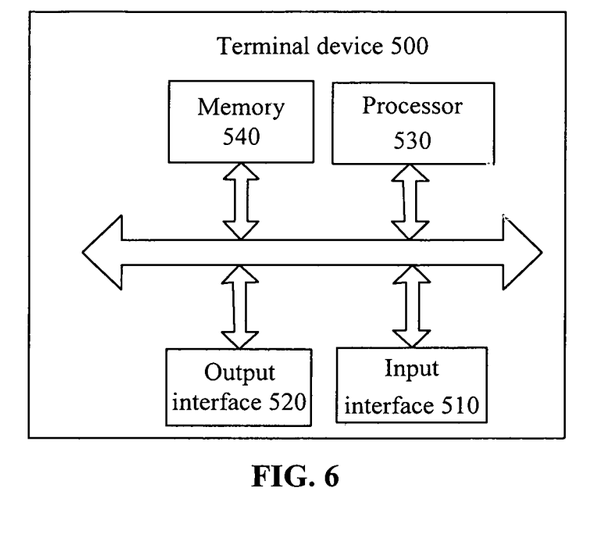
FIG. 6 is another schematic block diagram of a terminal device according to an embodiment of the disclosure.

As shown in FIG. 6, a terminal device 500 is further provided according to an embodiment of the disclosure. The terminal device 500 may be the terminal device 300 in FIG. 5, and may be configured to execute contents executed by the terminal device corresponding to the method 100 in FIG. 2. The terminal device 500 includes an input interface 510, an output interface 520, a processor 530 and a memory 540. The input interface 510, the output interface 520, the processor 530 and the memory 540 may be connected through a bus system. The memory 540 is configured to store a program, an instruction or a code. The processor 530 is configured to execute the program, the instruction or the code in the memory 540 to control the input interface 510 to receive a signal, control the output interface 520 to send a signal to implement operations in the above method embodiments.

Therefore, the terminal device according to the embodiment of the disclosure facilitates reducing complexity in detecting the PDCCH by the terminal device.

It is to be understood that, in the embodiment of the disclosure, the processor 530 may be a central processing unit (CPU) and the processor 530 may also be another universal processor, a digital signal processor, an application specific integrated circuit, a field-programmable gate array or another programmable logic device, a discrete gate or a transistor logic device and a discrete hardware component and the like. The universal processor may be a microprocessor. Alternatively, the processor may also be any conventional processor and the like.

The memory 540 may include a read-only memory and a random access memory, and provides an instruction and data for the processor 530. A part of the memory 540 may further include a nonvolatile random access memory. For example, the memory 540 may further store information about the type of the device.

In an implementation process, the content in the above method may be implemented by an integrated hardware logic circuit or a software instruction in the processor 530. The content of the method disclosed in combination with the embodiments of the disclosure may be directly embodied to be executed and implemented by a hardware processor or executed and implemented by a combination of hardware and software modules in the processor. The software module may be provided in a mature storage medium in the field such as a random access memory, a flash memory, a random-only memory, a programmable read-only memory or an electrically erasable programmable memory and a register. The storage medium is provided in the memory 540. The processor 530 reads information in the memory 540 and implements the content of the above method in combination with hardware thereof, which is not described in detail anymore to avoid repetitions.

In a specific implementation, the acquiring unit 320, the detecting unit 330, the determining unit 340 and the learning unit 350 in the terminal device 300 may be implemented by the processor 530 in FIG. 6, and the first receiving unit 310 and the second receiving unit 360 in the terminal device 300 may be implemented by the input interface 510 in FIG. 6.

Figure 7:
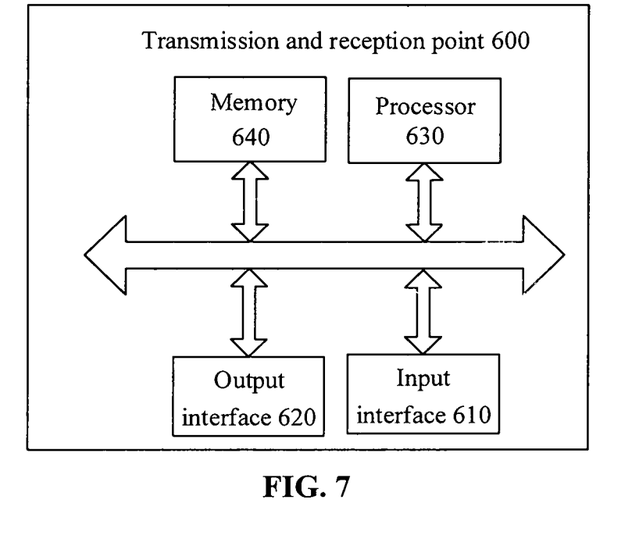
FIG. 7 is another schematic block diagram of a transmission and reception point according to an embodiment of the disclosure.

As shown in FIG. 7, a transmission and reception point 600 is further provided according to an embodiment of the disclosure. The transmission and reception point 600 may be the transmission and reception point 400 in FIG. 5, which may be configured to execute the content executed by the transmission and reception point corresponding to the method 200 in FIG. 3. The transmission and reception point 600 includes an input interface 610, an output interface 620, a processor 630 and a memory 640. The input interface 610, the output interface 620, the processor 630 and the memory 640 may be connected through a bus system. The memory 640 is configured to store a program, an instruction or a code. The processor 630 is configured to execute the program: the instruction or the code in the memory 640 to control the input interface 610 to receive a signal, control the output interface 620 to send a signal, so as to implement operations in the above mentioned embodiments.

Therefore, the transmission and reception point of the embodiment of the disclosure facilitates reducing complexity in detecting the PDCCH by a terminal device.

It is to be understood that, in the embodiment of the disclosure, the processor 630 may be a central processing unit (CPU) and the processor 630 may also be another universal processor, a digital signal processor, an application specific integrated circuit, a field-programmable gate array or another programmable logic device, a discrete gate or a transistor logic device and a discrete hardware component and the like. The universal processor may be a microprocessor. Alternatively, the processor may also be any conventional processor and the like.

The memory 640 may include a read-only memory and a read access memory and provides an instruction and data for the processor 630. A part of the memory 640 may further include a non-volatile read access memory. For example, the memory 640 may further store information about the type of the device.

In an implementation process, the content in the above method may be implemented by an integrated hardware logic circuit or a software instruction in the processor 630. The content of the method disclosed in combination with the embodiments of the disclosure may be directly embodied to be executed and implemented by a hardware processor or executed and implemented by a combination of hardware and software modules in the processor. The software module may be provided in a mature storage medium in the field such as a random access memory, a flash memory, a random-only memory, a programmable read-only memory or an electrically erasable programmable memory and a register. The storage medium is provided in the memory 640. The processor 630 reads information in the memory 640 and implements the content of the above method in combination with hardware thereof, which is not described in detail anymore to avoid repetitions.

In a specific implementation, the sending unit 410 in the transmission and reception point 400 may be implemented by the output interface 620 in FIG. 7.

A computer-readable storage medium is further provised according to an embodiment of the disclosure, in which one or more programs are stored. The one or more programs include instructions. The instructions, when being executed by a portable electronic device including multiple application programs, enable the portable electronic device to execute the method according to the embodiment shown in FIG. 2 or FIG. 3.

A computer program is further provided according to an embodiment of the disclosure, in which an instruction is contained. The computer program, when being executed by a computer, enables the computer to execute flows in the method according to the embodiment shown in FIG. 2 or FIG. 3.

Those skilled in the art may realize that units and algorithm steps of each example described in combination with the embodiments disclosed in the disclosure can be implemented by electronic hardware or a combination of computer software and the electronic hardware. Whether these functions are executed in a hardware manner or a software manner depends on specific applications and design constraints of the technical solutions. Professionals may realize described functions with different methods for applications, but such realization shall fall within the scope of the disclosure.

Those skilled in the art may clearly learn about that for operation processes of the system, device and unit described above, reference may be made to the corresponding processes in the above method embodiment, which is not be elaborated herein for convenient and brief description.

In some embodiments provided by the disclosure, it is to be understood that the disclosed system, device and method may be implemented in another manner. For example, the device embodiment described above is only schematic. For example, the units are only divided according to logic functions thereof, and the units may be divided in other manner during practical implementation. For example, multiple units or components may be combined or integrated into another system, or some characteristics may be omitted or not executed. In addition, coupling or direct coupling or a communication connection displayed or discussed may be indirect coupling or communication connection through some interfaces, the devices or the units, and may be electrical and mechanical or in other forms.

The units described as separate parts may or may not be physically separated, and parts displayed as units may or may not be physical units, that is, may be provided in the same place, or may also be distributed to multiple network units. A part or all of the units may be selected to achieve the purpose of the solutions of the embodiments according to a practical requirement.

In addition, all functional units in each embodiment of the disclosure may be integrated into a processing unit, or may also physically exist independently, or two or more than two units may also be integrated into a unit.

If the function is realized in form of software functional unit and sold or used as an independent product, the function may also be stored in a computer-readable storage medium. Based on such an understanding, an essential part or a part making contributions to the related art of the technical solutions of the disclosure or a part of the technical solutions may be embodied in form of software product, and the computer software product is stored in a storage medium. The computer software product includes multiple instructions configured to enable a computer device (which may be a personal computer, a server, a network device or the like) to execute all or a part of the steps of the method in each embodiment of the disclosure. The abovementioned storage medium includes: various media capable of storing program codes such as a U disk, a mobile hard disk, a read-only memory (ROM), a random access memory (RAM), a magnetic disk or an optical disk.

The foregoing is only the specific embodiments of the disclosure, and the scope of protection of the disclosure is not limited thereto. Any variations or replacements easily appreciated by those skilled in the art within the technical scope disclosed by the disclosure shall fall within the scope of protection of the disclosure. Therefore, the scope of protection of the disclosure shall conform to the scope of protection of the claims.

The invention claimed is:

1. A method for wireless communication, comprising:
   receiving, by a terminal device, first downlink control information in a first time-domain scheduling unit; and
   acquiring, by the terminal device, information about second downlink control information to be detected in the first time-domain scheduling unit according to the first downlink control information,
   wherein the first downlink control information and the second downlink control information are used for scheduling different data of the terminal device, respectively.

2. The method of claim 1, wherein the first downlink control information contains the information about the second downlink control information, and the acquiring, by the terminal device, the information about the second downlink control information to be detected in the first time-domain scheduling unit according to the first downlink control information comprises:
   acquiring, by the terminal device, the information about the second downlink control information from the first downlink control information.

3. The method of claim 2, further comprising:
   detecting, by the terminal device, the second downlink control information in the first time-domain scheduling unit according to the information about the second downlink control information.

4. The method of claim 1, wherein the information about the second downlink control information comprises at least one of a search space of the second downlink control information, an aggregation level of the second downlink control information, a resource position of the second downlink control information, a size of the second downlink control information, a format of the second downlink control information, beam information for receiving and/or sending the second downlink control information or quasi-co-location information of the second downlink control information.

5. The method of claim 1, further comprising:
   determining, by the terminal device, a number N of pieces of the second downlink control information according to the information about the second downlink control information, with N being an integer, N≤(M−1), M being a number of pieces of downlink control information pre-configured by a network device for the terminal device and M being a positive integer;
   if N is a positive integer, learning, by the terminal device, that N pieces of second downlink control information exist in the first time-domain scheduling unit; or
   if N is equal to 0, learning, by the terminal device, that no second downlink control information exists in the first time-domain scheduling unit.

6. The method of claim 5, wherein the information about the second downlink control information is a number N of pieces of the second downlink control information, or a number (N+1) of pieces of downlink control information sent by a transmission and reception point, and the downlink control information sent by the transmission and reception point comprises the first downlink control information and the second downlink control information.

7. The method of claim 1, further comprising:
   receiving, by the terminal device, instruction information sent by a network device, wherein the instruction information is used to instruct the terminal device to receive a plurality of pieces of downlink control information in the first time-domain scheduling unit.

8. The method of claim 1, wherein the first downlink control information and the second downlink control information are sent by different transmission and reception points.

9. A terminal device, comprising:
   an input interface;
   a processor; and
   a memory for storing instructions executable by the processor,
   wherein the processor is configured to execute the instructions to:
   control the input interface to receive first downlink control information in a first time-domain scheduling unit; and
   acquire information about second downlink control information to be detected in the first time-domain scheduling unit according to the first downlink control information,
   wherein the first downlink control information and the second downlink control information are used for scheduling different data of the terminal device, respectively.

10. The terminal device of claim 9, wherein the first downlink control information contains the information about the second downlink control information, and the processor is configured to:
    acquire the information about the second downlink control information from the first downlink control information.

11. The terminal device of claim 10, wherein the processor is further configured to:
    detect the second downlink control information in the first time-domain scheduling unit according to the information about the second downlink control information.

12. The terminal device of claim 9, wherein the information about the second downlink control information comprises at least one of a search space of the second downlink control information, an aggregation level of the second downlink control information, a resource position of the second downlink control information, a size of the second downlink control information, a format of the second downlink control information, beam information for receiving and/or sending the second downlink control information or quasi-co-location information of the second downlink control information.

13. The terminal device of claim 9, wherein the processor is further configured to:

determine a number N of pieces of the second downlink control information according to the information about the second downlink control information, with N being an integer, N≤(M−1), M being a number of pieces of downlink control information pre-configured by a network device for the terminal device and M being a positive integer; and if N is a positive integer, learn that N pieces of second downlink control information exist in the first time-domain scheduling unit, or if N is equal to 0, learn that no second downlink control information exists in the first time-domain scheduling unit.

14. The terminal device of claim 13, wherein the information about the second downlink control information is a number N of pieces of the second downlink control information, or a number (N+1) of pieces of downlink control information sent by a transmission and reception point, and the downlink control information sent by the transmission and reception point comprises the first downlink control information and the second downlink control information.

15. The terminal device of claim 9, wherein the processor is further configured to:

control the input interface to receive instruction information sent by the network device, wherein the instruction information is used to instruct the terminal device to receive a plurality of pieces of downlink control information in the first time-domain scheduling unit.

16. The terminal device of claim 9, wherein the first downlink control information and the second downlink control information are sent by different transmission and reception points.

17. A transmission and reception point, wherein the transmission and reception point is a first transmission and reception point, and the transmission and reception point comprises:

an output interface;
a processor; and
a memory for storing instructions executable by the processor, wherein the processor is configured to execute the instructions to:

control the output interface to send first downlink control information to a terminal device in a first time-domain scheduling unit, wherein the first downlink control information contains information about second downlink control information to be detected by the terminal device in the first time-domain scheduling unit, and the second downlink control information is used to indicate a downlink resource allocated for second downlink data, wherein the first downlink control information and the second downlink control information are used for scheduling different data of the terminal device, respectively.

18. The transmission and reception point of claim 17, wherein the information about the second downlink control information comprises at least one of a search space of the second downlink control information, an aggregation level of the second downlink control information, a resource position of the second downlink control information, a size of the second downlink control information, a format of the second downlink control information, beam information for receiving and/or sending of the second downlink control information or quasi-co-location information of the second downlink control information.

19. The transmission and reception point of claim 17, wherein the information about the second downlink control information is a number N of pieces of the second downlink control information, or a number (N+1) of pieces of downlink control information sent by at least one transmission and reception point, and at least one transmission and reception point comprises the first transmission and reception point, with N being an integer, N≤(M−1), M being a number of pieces of downlink control information pre-configured by a network device for the terminal device, and M being a positive integer.

20. The transmission and reception point of claim 17, wherein the second downlink control information is sent by a second transmission and reception point.

* * * * *